(12) United States Patent
Binder et al.

(10) Patent No.: US 11,440,412 B2
(45) Date of Patent: Sep. 13, 2022

(54) DISCONNECTION DEVICE FOR A HIGH-VOLTAGE ELECTRICAL SYSTEM OF A MOTOR VEHICLE, HIGH-VOLTAGE ELECTRICAL SYSTEM, AND MOTOR VEHICLE

(71) Applicant: Bayerische Motoren Werke Aktiengesellschaft, Munich (DE)

(72) Inventors: Michael Binder, Unterhaching (DE); Florian Pritscher, Munich (DE); Wladislaw Waag, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 220 days.

(21) Appl. No.: 16/831,305

(22) Filed: Mar. 26, 2020

(65) Prior Publication Data
US 2020/0223315 A1   Jul. 16, 2020

Related U.S. Application Data

(63) Continuation of application No. PCT/EP2018/084805, filed on Dec. 13, 2018.

(30) Foreign Application Priority Data

Dec. 15, 2017  (DE) ...................... 10 2017 222 846.6
May 9, 2018   (DE) ...................... 10 2018 207 247.7

(51) Int. Cl.
*B60L 3/04*    (2006.01)
*H01H 39/00*   (2006.01)
(Continued)

(52) U.S. Cl.
CPC ............. *B60L 3/04* (2013.01); *H01H 39/006* (2013.01); *H02H 7/22* (2013.01); *B60K 6/28* (2013.01);
(Continued)

(58) Field of Classification Search
CPC .. B60L 3/04; B60L 2270/20; B60L 2240/549; H02H 7/22; H02H 3/00;
(Continued)

(56) References Cited

U.S. PATENT DOCUMENTS 8,767,363 B2 * 7/2014 Johansson .............. H02H 3/087
                                                    361/62
10,137,783 B2   11/2018 Birner et al.
(Continued)

FOREIGN PATENT DOCUMENTS

CN       105684254 A    6/2016
CN       105814660 A    7/2016
(Continued)

OTHER PUBLICATIONS

International Search Report (PCT/ISA/210) issued in PCT Application No. PCT/EP2018/084805 dated Mar. 28, 2019 with English translation (four (4) pages).
(Continued)

*Primary Examiner* — Danny Nguyen
(74) *Attorney, Agent, or Firm* — Crowell & Moring LLP

(57) ABSTRACT

A disconnection device for a high-voltage electrical system of a motor vehicle for disconnecting a high-voltage line of the high-voltage electrical system, includes an overcurrent protection apparatus; a first disconnecting unit which is made of a first actuatable disconnecting unit, the first disconnecting unit being designed to interrupt a current flow over the first disconnecting unit in the activated state; a second disconnecting unit which is made of a second actuatable disconnecting unit and the overcurrent protection apparatus, the second disconnecting unit being designed to conduct an overcurrent to the overcurrent protection apparatus which interrupts the current flow over the second disconnecting unit in the activated state; and a control unit
(Continued)

which is designed to activate at least the second disconnecting unit in the event of an overcurrent and to activate at least the first disconnecting unit in the event of an overcurrent-independent event in order to separate the high-voltage line.

18 Claims, 2 Drawing Sheets

(51) Int. Cl.
  *H02H 7/22* (2006.01)
  *B60K 6/28* (2007.10)
  *B60R 21/01* (2006.01)
(52) U.S. Cl.
  CPC ..... *B60L 2240/549* (2013.01); *B60L 2270/20* (2013.01); *B60R 21/01* (2013.01); *B60Y 2200/91* (2013.01); *B60Y 2200/92* (2013.01)
(58) Field of Classification Search
  CPC .......... H02H 3/08; H02H 9/02; H02H 1/0007; H01H 39/00; H01H 39/006; H01H 71/12; H01H 71/10; B60R 21/01; B60R 16/02
  USPC .......................... 361/2–13, 86–87, 93.7–93.9
  See application file for complete search history.

(56) References Cited

U.S. PATENT DOCUMENTS

| | | | |
|---|---|---|---|
| 10,529,521 B2* | 1/2020 | De Palma | H01H 85/0241 |
| 2002/0105768 A1* | 8/2002 | Yamaguchi | H01H 37/761 361/58 |
| 2008/0137253 A1* | 6/2008 | George | H01H 9/106 29/428 |
| 2009/0303647 A1* | 12/2009 | Bauer | H02H 3/046 361/87 |
| 2010/0308647 A1 | 12/2010 | Fluhrer et al. | |
| 2016/0294177 A1 | 10/2016 | Krammer et al. | |
| 2018/0145498 A1* | 5/2018 | Handy | H02H 3/023 |
| 2018/0244219 A1* | 8/2018 | Sugisawa | H02H 1/0007 |

FOREIGN PATENT DOCUMENTS

| | | |
|---|---|---|
| CN | 105980196 A | 9/2016 |
| DE | 10 2013 012 578 A1 | 2/2015 |
| DE | 20 2014 003 287 U1 | 6/2015 |
| DE | 10 2014 206 270 A1 | 10/2015 |
| EP | 0 961 380 A2 | 12/1999 |
| GB | 2556081 A | 5/2018 |
| WO | WO 2008/031502 A1 | 3/2008 |

OTHER PUBLICATIONS

German-language Written Opinion (PCT/ISA/237) issued in PCT Application No. PCT/EP2018/084805 dated Mar. 28, 2019 (five (5) pages).

Chinese-language Office Action issued in Chinese Application No. 201880066439.0 dated Apr. 1, 2022 (ten (10) pages).

* cited by examiner

DISCONNECTION DEVICE FOR A HIGH-VOLTAGE ELECTRICAL SYSTEM OF A MOTOR VEHICLE, HIGH-VOLTAGE ELECTRICAL SYSTEM, AND MOTOR VEHICLE

CROSS REFERENCE TO RELATED APPLICATIONS

This application is a continuation of PCT International Application No. PCT/EP2018/084805, filed Dec. 13, 2018, which claims priority under 35 U.S.C. § 119 from German Patent Application No. 10 2017 222 846.6, filed Dec. 15, 2017 and German Patent Application No. 10 2018 207 247.7 filed May 9, 2018, the entire disclosures of which are herein expressly incorporated by reference.

BACKGROUND AND SUMMARY OF THE INVENTION

The invention relates to a disconnection device for a high-voltage on-board power system of a motor vehicle for disconnecting a high-voltage line of the high-voltage on-board power system, having an overcurrent protection apparatus for interrupting an overcurrent flowing through the high-voltage line. The invention furthermore relates to a high-voltage on-board power system and to a motor vehicle.

The focus is currently on high-voltage lines for motor vehicles that are able to transfer an electric current between high-voltage components or high-voltage units of the motor vehicle. Such high-voltage components may be for example a high-voltage battery, in particular a traction battery, and an electric drive machine, in particular a traction E-motor. In order to be able to reliably disconnect the high-voltage line in order to interrupt a flow of current between the high-voltage components in the case of an overcurrent flowing through the high-voltage line, it is already known from the prior art to use overcurrent protection apparatuses that trip when an overcurrent is present and thus disconnect the high-voltage line. Such overcurrent protection apparatuses may, for example, be fuses that are able to interrupt a circuit by melting a fuse element when a current strength of the current exceeds a particular threshold value over a predetermined duration.

A trip time of the fuse thus depends on an energy input, that is to say a strength of the overcurrent. Thus, if only a low overcurrent that barely exceeds the threshold value flows through the fuse, then the fuse trips only after a particular time. It may thus take a very long time to disconnect the high-voltage line. On account of these high switch-off times, it is not possible to ensure line protection of the high-voltage line in certain current ranges. Merely using the fuse also results in the disadvantage that, in the case of events independent of an overcurrent, for example in the case of a motor vehicle accident, in which no overcurrent flows but the high-voltage line should still be disconnected, it is not possible to disconnect the high-voltage line.

The object of the present invention is to be able to easily and reliably disconnect a high-voltage line of a high-voltage on-board power system of a motor vehicle in a manner independent of current strength.

This object is achieved according to the invention by a disconnection device, by a high-voltage on-board power system and by a motor vehicle having the features according to the respective independent patent claims. Advantageous refinements of the invention are the subject matter of the dependent patent claims, the description and the figures.

A disconnection device according to the invention for a high-voltage on-board power system of a motor vehicle serves to disconnect a high-voltage line of the high-voltage on-board power system and has an overcurrent protection apparatus for interrupting an overcurrent flowing through the high-voltage line. The disconnection device furthermore has a first disconnection unit formed by a first actuatable switch-off unit, wherein the first switch-off unit is designed to interrupt a flow of current through the first disconnection unit in the activated state. The disconnection device furthermore has a second disconnection unit formed by a second actuatable switch-off unit and the overcurrent protection apparatus, wherein the second switch-off unit is designed to channel an overcurrent to the overcurrent protection apparatus interrupting the flow of current through the second disconnection unit in the activated state. A control unit of the disconnection device is designed, in order to disconnect the high-voltage line, to activate at least the second switch-off unit in the case of an overcurrent flowing through the high-voltage line and to activate at least the first switch-off unit in the case of an event independent of an overcurrent.

The high-voltage line serves in particular to electrically connect high-voltage components of the high-voltage on-board power system to one another. The high-voltage line may for example connect a high-voltage battery to an electric drive machine of the motor vehicle, which is designed as an electric or hybrid vehicle. The disconnection device is designed to interrupt a flow of current between the high-voltage components or a circuit comprising the high-voltage components. In order to disconnect or interrupt the circuit, the disconnection device may be arranged in a plus path, that is to say in a high-voltage line connected to a plus pole of the high-voltage battery, and/or in a minus path, that is to say in a high-voltage line connected to a minus pole of the high-voltage battery. The disconnection device in this case in particular has the two disconnection units, wherein the first disconnection unit is formed by the first switch-off unit and the second disconnection unit is formed by the second switch-off unit and the overcurrent protection apparatus. The disconnection units may in this case be activated selectively by the control unit by actuating and activating the corresponding switch-off units.

In this case, the disconnection units or the switch-off units are actuated depending on an event in which the high-voltage line should be disconnected, for example for line protection purposes or in order to protect people. During normal operation, that is to say in the absence of such an event, the disconnection units and therefore the disconnection device are deactivated and the current or operating current of the high-voltage on-board power system flows between the high-voltage components through the high-voltage line and the disconnection device. By way of example, the first disconnection unit and the second disconnection unit may be connected in series and be arranged in the main current flow path of the high-voltage line. During normal operation, the entire operating current thus flows through both deactivated disconnection units. The flow of current may in this case be interrupted by the second disconnection unit alone in the case of the overcurrent and be interrupted by the first disconnection unit alone independently of an overcurrent. In the case of an event independent of an overcurrent in which the high-voltage line should be disconnected, that is to say for example in the case of a motor vehicle accident, at least the first disconnection unit or the first switch-off unit is activated. For this purpose, the first switch-off unit is in particular designed to switch currents at least up to an operating current limit of the motor vehicle.

In the case of an overcurrent, at least the second switch-off unit or the second disconnection unit is activated. In the case that the second disconnection unit is connected in series with the first disconnection unit, the flow of current may also be interrupted by the second disconnection unit alone, provided that the current corresponds to an overcurrent. By activating the second switch-off unit, the flow of overcurrent is channeled through the overcurrent protection apparatus, which then trips and interrupts the flow of overcurrent. The overcurrent protection apparatus trips in particular just by virtue of the overcurrent flowing through it and therefore does not have to be actuated separately. The overcurrent protection apparatus is preferably designed as a fuse. The flow of current is thus in particular channeled completely through the overcurrent protection apparatus only when the second switch-off unit is activated. This results in the advantage that it is possible to use an overcurrent protection apparatus that, although it has a high current disconnection capacity, only has to have a low current carrying capacity. The overcurrent protection apparatus may thus be designed to be less expensive, to have smaller dimensions and to have a lower weight.

By virtue of the disconnection options, independent of an overcurrent, provided by the disconnection device for the high-voltage line, it is possible to ensure that the high-voltage line is able to be disconnected and therefore that the flow of current between the high-voltage components is reliably able to be completely interrupted, both in the case of an overcurrent and in the case of a critical motor vehicle event or accident in which in particular no overcurrent that activates the overcurrent protection apparatus flows.

In one development of the invention, the disconnection device has a first current measurement apparatus for recording a current value of the current flowing through the high-voltage line. The control unit is designed to detect the overcurrent on the basis of the recorded current value. The first current measurement apparatus is in particular arranged in the main current flow path of the high-voltage line and records the current magnitude or current strength of the current flowing through the main current flow path. The first current measurement apparatus may in this case communicate with the control unit. By way of example, the control unit may compare the current values recorded by the first current measurement apparatus with a predetermined overcurrent threshold value and activate at least the second disconnection unit if the overcurrent threshold value is exceeded.

In a further embodiment of the invention, the control unit is designed to receive a signal from an accident detection device of the motor vehicle, in particular from an airbag controller, and to detect a motor vehicle accident as the event independent of an overcurrent on the basis of the signal. As soon as for example the control unit receives a signal from the airbag controller, the control unit detects the critical motor vehicle event, that is to say the accident or crash, and then activates at least the first disconnection unit. By virtue of the communication with the rapid-response airbag controller, it is advantageously possible to disconnect the high-voltage line particularly quickly in the case of an accident. The control unit may also communicate directly with an accident sensor system of the motor vehicle, for example acceleration and rate of rotation sensors, and detect the motor vehicle accident on the basis of the signals from the accident sensor system.

The first switch-off unit is preferably designed as a pyrotechnic switch-off unit that channels a flow of current through the first disconnection unit in the deactivated state and interrupts a flow of current through the first disconnection unit in an activated state and that is able to be ignited by the control unit. The first switch-off unit may be for example what is known as a pyrofuse. In order to activate the pyrotechnic switch-off unit, the control unit may generate an ignition signal for the pyrotechnic switch-off unit and thus irreversibly activate it. By virtue of activating the pyrotechnic first switch-off unit in the case independent of an overcurrent, for example in the case of the accident, it is possible to reliably and permanently disconnect the high-voltage line. Pyrotechnic switch-off units furthermore have the advantage of a particularly fast trip time, in particular less than 3 ms.

There may also be provision for the second switch-off unit to be designed as an in particular pyrotechnic switch-off unit that channels a flow of current through the second disconnection unit in the deactivated state and channels a flow of current to the overcurrent protection apparatus in an activated state. The second switch-off unit is preferably a pyrotechnic switch-off unit and is able to be ignited by the control unit in order to be activated. By virtue of the second pyrotechnic switch-off unit, the high-voltage line is thus able to be disconnected quickly, reliably and irreversibly, even in the case of an overcurrent. The second switch-off unit may also be designed as a relay.

In one development, the second disconnection unit has a parallel circuit consisting of the overcurrent protection apparatus and the second switch-off unit and is connected in series with the first disconnection unit, wherein the control unit is designed to activate only the first switch-off unit in the case of the event independent of an overcurrent and to activate only the second switch-off unit in the case of the overcurrent flowing through the high-voltage line. The second disconnection unit is thus formed by the parallel circuit consisting of the overcurrent protection apparatus and the second switch-off unit. During normal operation, the operating current flows through both deactivated series-connected disconnection units. At the second disconnection unit, the deactivated second switch-off unit forms a low-resistance path in parallel with the overcurrent protection apparatus, such that the entire operating current flowing through the second disconnection unit in particular flows mainly through the deactivated second switch-off unit. The second switch-off unit is in particular a pyrotechnic switch-off unit that is not ignited in the deactivated state. In order to disconnect the high-voltage line in the case of the overcurrent, the low-resistance path in the second disconnection unit is interrupted by activating the second switch-off unit, for example by igniting the second pyrotechnic switch-off unit, such that the flow of current then flows completely through the overcurrent protection apparatus. This then trips and interrupts the overcurrent. In order to disconnect the high-voltage line in the case of the critical event independent of an overcurrent, the control unit activates the first disconnection unit. By way of example, the control unit ignites the first switch-off unit that is designed as a pyrotechnic switch-off unit. The flow of current is then completely interrupted. This embodiment results in the advantage that only one of the two disconnection units has to be activated in order to disconnect the high-voltage line.

In another development, the overcurrent protection apparatus and the first switch-off unit are connected in series and the second switch-off unit is connected in parallel with the series circuit consisting of the overcurrent protection apparatus and the first switch-off unit. The control unit is designed to activate the first and the second switch-off unit in the case of the event independent of an overcurrent and to activate only the second switch-off unit in the case of the overcurrent. During normal operation, the complete operating current in this case flows mainly through the second switch-off unit forming the low-resistance path. At most a small portion of the operating current flows through the overcurrent protection apparatus and the first switch-off unit connected in series therewith. This results in the advantage that the first switch-off unit is able to be designed with a lower current carrying capacity. The overcurrent is disconnected, as already described, by channeling the overcurrent from the low-resistance path formed by the second switch-off unit to the overcurrent protection apparatus, which then trips. Both switch-off units are activated in order to disconnect the high-voltage lines independently of an overcurrent.

It proves to be advantageous if the disconnection device has a second current measurement apparatus, connected in series with the overcurrent protection apparatus, for monitoring a functionality of the overcurrent protection apparatus. The current measurement apparatus, during normal operation, may monitor whether the overcurrent protection apparatus is functional by recording whether at least a small current flows through the path containing the overcurrent protection apparatus, which path is connected in parallel with the low-resistance path containing the second switch-off unit. If a current flows, then the current measurement apparatus is able to detect that the overcurrent protection apparatus has not yet tripped and is therefore still functional. The disconnection device is thus designed to be particularly safe.

The second disconnection unit particularly preferably has a series circuit consisting of the overcurrent protection apparatus and the second switch-off unit, wherein the second switch-off unit is designed as a switch that is open in a deactivated state and closed in the activated state. The first disconnection unit is furthermore connected in parallel with the second disconnection unit and the control unit is designed to activate only the first switch-off unit in the case of the event independent of an overcurrent and to activate the second and the first switch-off unit in the case of the overcurrent flowing through the high-voltage line. The second disconnection unit is thus formed by the series circuit consisting of the switch and the overcurrent protection apparatus. The switch is in particular a semiconductor switch that has a high peak current carrying capability and that is designed for rapid switching. By way of example, the semiconductor switch may be a thyristor or MOSFET. During normal operation, in which the disconnection units are deactivated and the switch is open, the entire operating current flows through the first switch-off unit and thus the first disconnection unit. The parallel-connected path through the second disconnection unit is interrupted by the open switch. In the case of the critical event, the first disconnection unit or the first switch-off unit is activated. In addition to the path interrupted by the open switch, the parallel path running through the first disconnection unit is thereby interrupted.

In the case of the overcurrent, the switch is first of all closed by the control unit. After the switch is closed, the first switch-off unit is activated, that is to say for example the pyrotechnic switch-off unit is ignited by the control unit through the generation of an ignition signal. The flow of current through the first disconnection unit is thereby interrupted, and the complete current in the form of the overcurrent flows through the overcurrent protection apparatus. This then trips and interrupts the flow of current through the second disconnection unit. This design of the disconnection device results in the advantage that no light arc is created in the first switch-off unit.

It proves to be advantageous if the disconnection device has a discharge unit for discharging a high-voltage intermediate circuit of the high-voltage on-board power system, which discharge unit is electrically connected to the overcurrent protection apparatus and is able to be electrically connected to the high-voltage intermediate circuit via the overcurrent protection apparatus, wherein the disconnection device, in the activated state of the discharge unit, is designed to form a discharge path through the overcurrent protection apparatus and the discharge unit. The control unit is in particular designed to additionally activate the discharge unit in the case of the event independent of an overcurrent.

The high-voltage intermediate circuit serves to buffer-store electrical energy of the high-voltage battery for a high-voltage component electrically connected to the high-voltage intermediate circuit. The high-voltage intermediate circuit is electrically connected to the high-voltage battery via the disconnection device. The high-voltage intermediate circuit may furthermore be electrically connected to a drive machine via a converter. The converter may convert the energy stored in the intermediate circuit, for example into a three-phase AC voltage for the drive machine. In particular in the case of the event independent of an overcurrent, for example the accident or crash, the high-voltage intermediate circuit should be discharged quickly, in addition to the rapid disconnection of the high-voltage battery from the high-voltage intermediate circuit. Otherwise, a deformation of the motor vehicle could lead to a short circuit between the high-voltage on-board power system and a low-voltage on-board power system, with subsequent destruction of low-voltage components of the low-voltage on-board power system.

There is therefore provision for the discharge unit to be activated in the case of the event independent of an overcurrent, which discharge unit converts the energy from the high-voltage intermediate circuit into heat, for example, in order to discharge the high-voltage intermediate circuit. Due to the fact that the discharge path comprises the overcurrent protection apparatus and the energy is dissipated to the discharge unit via the overcurrent protection apparatus, the overcurrent protection apparatus may advantageously function as overload protection for the discharge unit. The overcurrent protection apparatus may thus be used both to disconnect the high-voltage line in the overcurrent case and to protect the discharge path. There may be provision in this case for the discharge unit to have a series circuit consisting of a switch-on unit and a discharge resistor, wherein the switch-on unit, in the activated state, in order to form the discharge path, is designed to electrically connect the high-voltage intermediate circuit to the discharge resistor via the overcurrent protection apparatus. The switch-on unit is preferably designed as a pyrotechnic switch-on unit. In the deactivated state of the discharge unit, the switch-on unit is open and the discharge resistor is disconnected from the overcurrent protection apparatus. In order to activate the discharge unit, the switch-on unit is closed and the discharge resistor is electrically connected to the high-voltage intermediate circuit via the overcurrent protection apparatus. As a result, the energy that is still stored in the high-voltage intermediate circuit is converted into heat via the discharge resistor and thus dissipated. For this purpose, the discharge resistor is dimensioned so as to be large enough to be able to convert the energy stored in the high-voltage intermediate circuit into heat. The pyrotechnic switch-on unit in particular has a high switching speed in order to quickly activate the discharge unit and a high peak current carrying capacity.

The invention furthermore relates to a high-voltage on-board power system for a motor vehicle having at least one high-voltage line in order to electrically connect high-voltage components of the high-voltage on-board power system and at least one disconnection device according to the invention or an embodiment thereof. The high-voltage components are in particular a high-voltage battery and an electric drive machine whose supply of energy via the high-voltage line is able to be disconnected independently of an operating current by way of the at least one disconnection device.

A motor vehicle according to the invention comprises a high-voltage on-board power system according to the invention. The motor vehicle is in particular designed as an electric vehicle or hybrid vehicle.

The embodiments set forth with reference to the disconnection device according to the invention and the advantages thereof apply analogously to the high-voltage on-board power system according to the invention and to the motor vehicle according to the invention.

Other objects, advantages and novel features of the present invention will become apparent from the following detailed description of one or more preferred embodiments when considered in conjunction with the accompanying drawings.

BRIEF DESCRIPTION OF THE DRAWINGS

Identical and functionally identical elements are provided with the same reference signs in the figures.

DETAILED DESCRIPTION OF THE DRAWINGS

Figure 1:
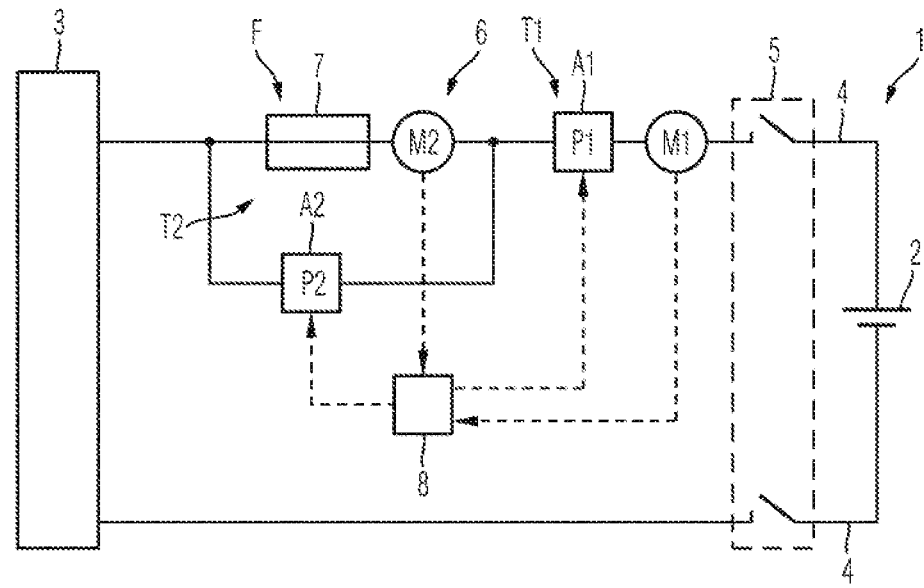
FIG. 1 is a schematic illustration of a high-voltage on-board power system of a motor vehicle with a first embodiment of a disconnection device according to the invention.

FIG. 1 to FIG. 4 each show a high-voltage on-board power system 1 for a motor vehicle that is not shown here. The motor vehicle is in particular designed as an electrically driveable motor vehicle. The high-voltage on-board power system 1 in this case has two high-voltage components 2, 3. A first high-voltage component 2 is designed here as a high-voltage battery. A second high-voltage component 3 is designed here as an electric drive machine. The high-voltage components 2, 3 are electrically connected to one another here via high-voltage lines 4, wherein electrical energy is able to be transferred between the high-voltage components 2, 3 via the high-voltage lines 4. The high-voltage lines 4 in this case have a main contactor 5, by way of which a transfer of energy between the high-voltage components 2, 3 is able to be interrupted. This main contactor 5 is in particular open in the parked state of the motor vehicle in order to interrupt the supply of energy to the drive machine by the high-voltage battery.

The high-voltage on-board power system 1 furthermore has at least one disconnection device 6 that is arranged here in a high-voltage line 4 forming a plus path of the high-voltage on-board power system 1. As an alternative or in addition, a disconnection device 6 may be arranged in a high-voltage line 4 forming a minus path of the high-voltage on-board power system 1. The disconnection device 6 is designed to interrupt a current flowing through the high-voltage line 4 and thus to disconnect the high-voltage line 4 independently of a current magnitude or current strength of the current flowing through the high-voltage line 4. The disconnection device 6 may thus disconnect the flow of current in the case of an overcurrent flowing through the high-voltage line 4 and in the case of a critical motor vehicle event in the absence of an overcurrent. Such a critical event may for example be a motor vehicle accident or crash.

For this purpose, the disconnection device 6 has two disconnection units T1, T2 that are able to be actuated separately. A first disconnection unit T1 has a first actuatable switch-off unit A1. A second disconnection unit T2 has a second actuatable switch-off unit A2 and an overcurrent protection apparatus F. The overcurrent protection apparatus F is designed in particular as a fuse 7 that melts in the case of an overcurrent. A control unit 8 of the disconnection device 6 is designed to actuate the switch-off units A1, A2 and thus to actuate the disconnection units T1, T2. The control unit 8 may for example be a microcontroller. The control unit 8 may be designed as a stand-alone component or be integrated into a controller of the motor vehicle. The first switch-off unit A1 may be designed for example as a first pyrotechnic switch-off unit P1 that is able to be ignited and thus activated by an ignition signal generated by the control unit 8. The first switch-off unit A1 may however also be designed as a relay that is able to be activated by a current signal generated by the control unit 8. The first switch-off unit A1 is in particular designed to switch currents at least up to an operating current limit of the motor vehicle.

The disconnection device 6 furthermore has a first current measurement apparatus M1 for measuring a current magnitude or current strength of the current flowing through the high-voltage line 4. The first current measurement apparatus M1 thus serves here to monitor the entire battery current. The control unit 8 is able to detect an overcurrent on the basis of the current magnitude measured by the first measurement apparatus M1. In order to detect a motor vehicle accident, the control unit 8 may for example receive a signal from an airbag controller, not shown here. The control unit 8, in order to detect the accident, may also receive signals from crash sensors of the motor vehicle, for example from acceleration sensors and rate of rotation sensors of the motor vehicle.

In a first embodiment of the disconnection device 6 according to FIG. 1, the first disconnection unit T1 and the second disconnection unit T2 are connected in series. During normal operation, that is to say in the absence of an overcurrent and a critical event, the disconnection device 6 is deactivated and the current or operating current flows through the deactivated first disconnection unit T1 and the deactivated second disconnection unit T2. In order to disconnect the high-voltage line 4 in the case of the critical motor vehicle event or accident, the control unit 8 activates the first disconnection unit T1 by activating the first switch-off unit A1. By way of example, the control unit 8, after receiving the signal from the airbag controller, may supply the ignition signal to the first pyrotechnic switch-off unit P1, which then interrupts the flow of current through the first disconnection unit T1 and thus through the entire high-voltage line 4. The second disconnection unit T2 or the second switch-off unit A2 may remain deactivated.

The second disconnection unit T2 in this case has a parallel circuit consisting of the overcurrent protection apparatus F and the second switch-off unit A2. A second current measurement apparatus M2 is furthermore in this case connected in series with the overcurrent protection apparatus F in order to monitor a functionality of the overcurrent protection apparatus F. The overcurrent protection apparatus F in particular has a low current carrying capacity but a high current disconnection capacity. The second switch-off unit A2 may be designed as a second pyrotechnic switch-off unit P2 and be activated by way of an ignition signal generated by the control unit 8. The second switch-off unit A2 does not in this case have to be designed to disconnect under load, but in particular has a high current carrying capacity since, during normal operation, virtually the complete operating current flowing through the second disconnection unit T2 flows through a low-resistance path formed by the second switch-off unit A2.

In the case of the overcurrent, the control unit 8 activates the second switch-off unit A2, as a result of which the low-resistance path is disconnected. The complete overcurrent thereby flows through the path in parallel with the second switch-off unit A2 containing the overcurrent protection apparatus F, which then trips and interrupts the high-voltage line 4. By virtue of activating the second switch-off unit A2 and tripping the overcurrent protection apparatus F in the case of the overcurrent, the flow of current through the second disconnection unit T2 is interrupted and the high-voltage line 4 is thus disconnected. The first disconnection unit T1 or the first switch-off unit A1 may in this case likewise remain deactivated. In order to disconnect the high-voltage line 4, it is thus enough to activate only one of the two disconnection units T1, T2, wherein the second disconnection unit T2 interrupts the flow of current only in the case of the overcurrent.

Figure 2:
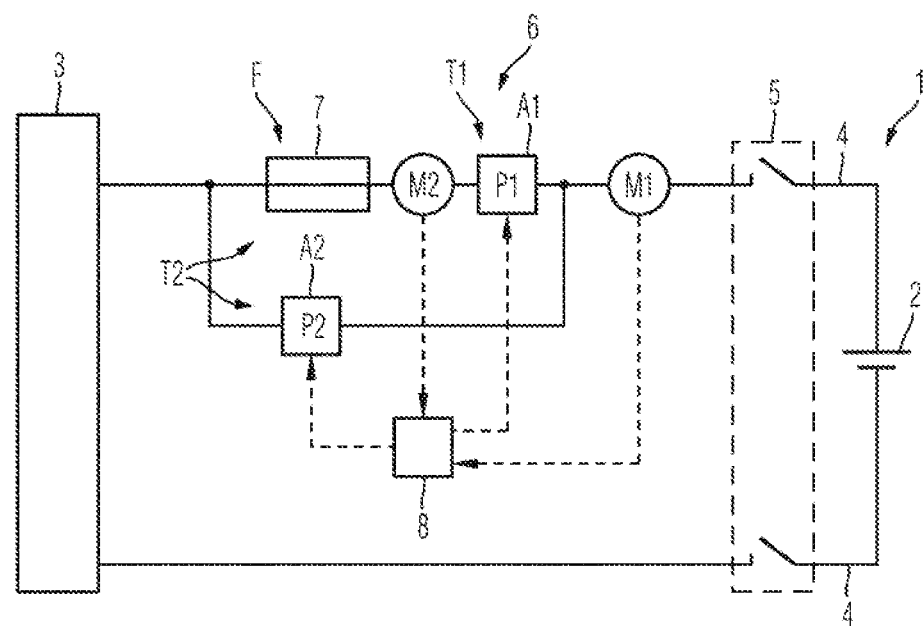
FIG. 2 is a schematic illustration of a high-voltage on-board power system of a motor vehicle with a second embodiment of a disconnection device according to the invention.

In a second embodiment of the disconnection device 6 according to FIG. 2, the first switch-off unit A1 and the overcurrent protection apparatus F are connected in series. The second switch-off unit A2 is connected in parallel with the series circuit consisting of the first switch-off unit A1 and the overcurrent protection apparatus F. Since, during normal operation, the entire operating current transported through the high-voltage line 4 flows virtually completely through the second switch-off unit A2, the first switch-off unit A1 is able to be designed with a lower current carrying capacity. In the overcurrent case, the second switch-off unit A2 is again activated by the control unit 8 and then interrupts the low-resistance path and channels the overcurrent to the overcurrent protection apparatus F. This then interrupts the high-voltage line 4, even if the first disconnection unit A1 is deactivated. In the case of the critical motor vehicle event, the control unit 8 activates both switch-off apparatuses A1, A2 such that both the low-resistance path and the parallel path containing the series circuit with the overcurrent protection apparatus F and the first switch-off unit A1 is interrupted, and the high-voltage line 4 is thus disconnected.

Figure 3:
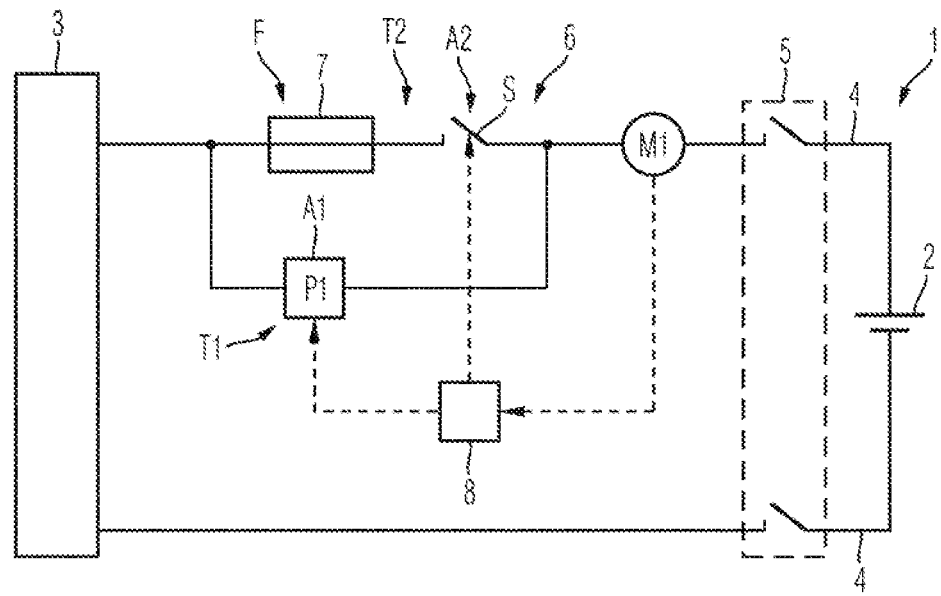
FIG. 3 is a schematic illustration of a high-voltage on-board power system of a motor vehicle with a third embodiment of a disconnection device according to the invention.

In a third embodiment of the disconnection device 6 according to FIG. 3, the second disconnection unit T2 has a series circuit consisting of the overcurrent protection apparatus F and the second switch-off unit A2. The second switch-off unit A2 is designed here as a switch S, in particular as a semiconductor switch. The switch S is for example designed as a thyristor or MOSFET and therefore has a particularly high switching speed and a high peak current carrying capacity. The switch S is open during normal operation, such that the entire operating current flows through the first disconnection unit T1 connected in parallel with the second disconnection unit T2. In the case of a motor vehicle accident, the control unit 8 activates the first switch-off unit A1 or the first disconnection unit T1, which then interrupts the flow of current. Due to the open switch S of the second disconnection unit T2, no flow of current is possible through the second disconnection unit T2 either, such that the high-voltage line 4 is disconnected. In the overcurrent case, the switch S is closed first of all and therefore the second disconnection unit T2 is activated. The first switch-off unit A1 is then activated, such that the flow of current flows solely through the series circuit of the second disconnection unit T2. The overcurrent protection apparatus F contained therein trips in the case of the overcurrent and thus disconnects the high-voltage line 4.

Figure 4:
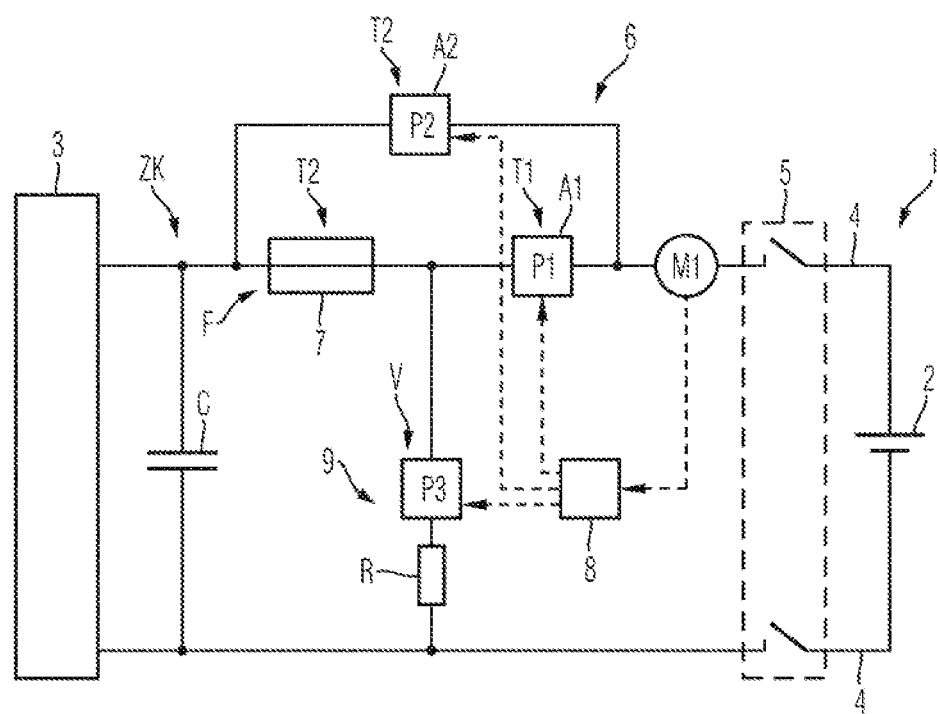
FIG. 4 is a schematic illustration of a high-voltage on-board power system of a motor vehicle with a fourth embodiment of a disconnection device according to the invention.

In a fourth embodiment of the disconnection device 6 according to FIG. 4, the disconnection device 6 additionally has a discharge unit 9. The disconnection units T1, T2 in this case correspond to the disconnection units T1, T2 of the embodiment of the disconnection device 6 according to FIG. 2. The disconnection units T1, T2 could however also correspond to disconnection units T1, T2 of the embodiments of the disconnection device 6 according to FIG. 1 or FIG. 3. The discharge unit 9 serves to discharge a high-voltage intermediate circuit ZK of the high-voltage on-board power system 1. The high-voltage intermediate circuit ZK in this case has an intermediate circuit capacitor C that is designed for example to buffer-store the energy of the high-voltage battery 2 for the drive machine 3. The drive machine 3 may for example have an integrated converter that is designed to convert the energy stored in the high-voltage intermediate circuit ZK into a three-phase AC voltage in order to energize phases of the drive machine 3.

Otherwise, a deformation of the motor vehicle could lead to a short circuit between the high-voltage on-board power system 1 and a low-voltage on-board power system, with subsequent destruction of low-voltage components of the low-voltage on-board power system. The discharge unit 9 is electrically connected to the high-voltage intermediate circuit ZK via the overcurrent protection apparatus F. The discharge unit 9 has a switch-on unit V and a discharge resistor R in series with the switch-on unit V. The switch-on unit V is designed in particular as a pyrotechnic switch-on unit P3. In the deactivated state of the discharge unit 9, that is to say when the high-voltage intermediate circuit ZK is not intended to be discharged, the switch-on unit V is open, such that a discharge path through the overcurrent protection apparatus F and the discharge unit 9 is not formed. In the activated state of the discharge unit 9, that is to say when the high-voltage intermediate circuit ZK is intended to be discharged, the switch-on unit V is closed, such that a discharge path is formed from the intermediate circuit capacitor C through the overcurrent protection apparatus F and the discharge unit 9. In this case, the energy of the high-voltage intermediate circuit ZK is converted into heat at the discharge resistor R of the discharge unit 9. The control unit 8 may close the switch-on unit V in order to activate the discharge unit 9.

During normal operation, the operating current flows through the parallel circuit of the disconnection device 6, which comprises the second pyrotechnic switch-off unit P2 and the series circuit consisting of the overcurrent protection apparatus F and first pyrotechnic switch-off unit P1. In the case of the accident, for example following a signal from the airbag controller, the control unit 8 may activate or ignite the second pyrotechnic switch-off unit P2 and, with a time delay, the first pyrotechnic switch-off unit P1. The current is thus disconnected by the pyrotechnic switch-off units P1, P2.

After the current has been disconnected, the pyrotechnic switch-on unit P3 is closed and the discharge unit 9 is thus activated. As a result, the high-voltage intermediate circuit ZK is discharged. The overcurrent protection apparatus F in this case forms overload protection for the discharge path.

In the overcurrent case that is detected for example on the basis of the measured signal from the current measurement apparatus M1, the control unit 8 activates or ignites the second pyrotechnic switch-off unit P2. The overcurrent is then channeled completely through the overcurrent protection apparatus F and the pyrotechnic switch-off unit P1, as a result of which the overcurrent protection apparatus F trips. After the overcurrent protection apparatus F trips, the circuit is disconnected and a safe state is achieved.

LIST OF REFERENCE SIGNS 1 high-voltage on-board power system
2 first high-voltage component
3 second high-voltage component
4 high-voltage lines
5 main contactor
6 disconnection device
7 fuse
8 control unit
9 discharge unit
T1, T2 disconnection units
A1, A2 switch-off units
P1, P2 pyrotechnic switch-off units
M1, M2 current measurement apparatuses
F overcurrent protection apparatus
S switch
ZK high-voltage intermediate circuit
C intermediate circuit capacitor
V switch-on unit
P3 pyrotechnic switch-on unit
R discharge resistor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disconnection device for a high-voltage on-board power system of a motor vehicle for disconnecting a high-voltage line of the high-voltage on-board power system, comprising:
    an overcurrent protection apparatus for interrupting an overcurrent flowing through the high-voltage line;
    a first disconnection unit formed by a first actuatable switch-off unit, wherein the first switch-off unit is designed to interrupt a flow of current through the first disconnection unit in the activated state,
    a second disconnection unit formed by a second actuatable switch-off unit and the overcurrent protection apparatus, wherein the second switch-off unit is designed to channel the overcurrent to the overcurrent protection apparatus interrupting the flow of current through the second disconnection unit in the activated state; and
    a control unit that, in order to disconnect the high-voltage line, is designed to activate at least the second switch-off unit in the case of an overcurrent flowing through the high-voltage line and to activate at least the first switch-off unit in the case of an event independent of an overcurrent, wherein
    the control unit is designed to receive a signal from an accident detection device of the motor vehicle, and to detect a motor vehicle accident as the event independent of an overcurrent on the basis of the signal.

2. The disconnection device according to claim 1, wherein the overcurrent protection apparatus is a fuse.

3. The disconnection device according to claim 1, further comprising:
    a first current measurement apparatus for recording a current value of the current flowing through the high-voltage line, wherein
    the control unit is designed to detect the overcurrent on the basis of the recorded current value.

4. The disconnection device according to claim 1, wherein the accident protection device is an airbag controller.

5. A disconnection device for a high-voltage on-board power system of a motor vehicle for disconnecting a high-voltage line of the high-voltage on-board power system, comprising:
    an overcurrent protection apparatus for interrupting an overcurrent flowing through the high-voltage line;
    a first disconnection unit formed by a first actuatable switch-off unit, wherein the first switch-off unit is designed to interrupt a flow of current through the first disconnection unit in the activated state,
    a second disconnection unit formed by a second actuatable switch-off unit and the overcurrent protection apparatus, wherein the second switch-off unit is designed to channel the overcurrent to the overcurrent protection apparatus interrupting the flow of current through the second disconnection unit in the activated state; and
    a control unit that, in order to disconnect the high-voltage line, is designed to activate at least the second switch-off unit in the case of an overcurrent flowing through the high-voltage line and to activate at least the first switch-off unit in the case of an event independent of an overcurrent, wherein
    the first switch-off unit is designed as a pyrotechnic switch-off unit that channels a flow of current through the first disconnection unit in the deactivated state and interrupts a flow of current through the first disconnection unit in an activated state and that is able to be ignited by the control unit in order to be activated.

6. The disconnection device according to claim 5, wherein the second switch-off unit is designed as a pyrotechnic switch-off unit that channels a flow of current through the second disconnection unit in the deactivated state and channels a flow of current to the overcurrent protection apparatus in an activated state.

7. A disconnection device for a high-voltage on-board power system of a motor vehicle for disconnecting a high-voltage line of the high-voltage on-board power system, comprising:
    an overcurrent protection apparatus for interrupting an overcurrent flowing through the high-voltage line;
    a first disconnection unit formed by a first actuatable switch-off unit, wherein the first switch-off unit is designed to interrupt a flow of current through the first disconnection unit in the activated state,
    a second disconnection unit formed by a second actuatable switch-off unit and the overcurrent protection apparatus, wherein the second switch-off unit is designed to channel the overcurrent to the overcurrent protection apparatus interrupting the flow of current through the second disconnection unit in the activated state; and a control unit that, in order to disconnect the high-voltage line, is designed to activate at least the second switch-off unit in the case of an overcurrent flowing through the high-voltage line and to activate at least the first switch-off unit in the case of an event independent of an overcurrent, wherein the second switch-off unit is designed as a pyrotechnic switch-off unit that channels a flow of current through the second disconnection unit in the deactivated state and channels a flow of current to the overcurrent protection apparatus in an activated state.

8. The disconnection device according to claim 6, wherein
the second disconnection unit has a parallel circuit comprising the overcurrent protection apparatus and the second switch-off unit and is connected in series with the first disconnection unit,
the control unit is designed to activate only the first switch-off unit in the case of the event independent of an overcurrent and to activate only the second switch-off unit in the case of the overcurrent flowing through the high-voltage line.

9. The disconnection device according to claim 6, wherein
the overcurrent protection apparatus and the first switch-off unit are connected in series and the second switch-off unit is connected in parallel with the series circuit comprising the overcurrent protection apparatus and the first switch-off unit,
the control unit is designed to activate the first and the second switch-off unit in the case of the event independent of an overcurrent and to activate only the second switch-off unit in the case of the overcurrent.

10. The disconnection device according to claim 8, wherein
the disconnection device has a second current measurement apparatus, connected in series with the overcurrent protection apparatus, for monitoring a functionality of the overcurrent protection apparatus.

11. The disconnection device according to claim 9, wherein
the disconnection device has a second current measurement apparatus, connected in series with the overcurrent protection apparatus, for monitoring a functionality of the overcurrent protection apparatus.

12. A disconnection device for a high-voltage on-board power system of a motor vehicle for disconnecting a high-voltage line of the high-voltage on-board power system, comprising:
an overcurrent protection apparatus for interrupting an overcurrent flowing through the high-voltage line;
a first disconnection unit formed by a first actuatable switch-off unit, wherein the first switch-off unit is designed to interrupt a flow of current through the first disconnection unit in the activated state,
a second disconnection unit formed by a second actuatable switch-off unit and the overcurrent protection apparatus, wherein the second switch-off unit is designed to channel the overcurrent to the overcurrent protection apparatus interrupting the flow of current through the second disconnection unit in the activated state; and
a control unit that, in order to disconnect the high-voltage line, is designed to activate at least the second switch-off unit in the case of an overcurrent flowing through the high-voltage line and to activate at least the first switch-off unit in the case of an event independent of an overcurrent, wherein
the second disconnection unit has a series circuit consisting of the overcurrent protection apparatus and the second switch-off unit,
the second switch-off unit is designed as a switch that is open in a deactivated state and closed in the activated state,
the first disconnection unit is connected in parallel with the second disconnection unit, and
the control unit is designed to activate only the first switch-off unit in the case of the event independent of an overcurrent and to activate the second and the first switch-off unit in the case of the overcurrent flowing through the high-voltage line.

13. A disconnection device for a high-voltage on-board power system of a motor vehicle for disconnecting a high-voltage line of the high-voltage on-board power system, comprising:
an overcurrent protection apparatus for interrupting an overcurrent flowing through the high-voltage line;
a first disconnection unit formed by a first actuatable switch-off unit, wherein the first switch-off unit is designed to interrupt a flow of current through the first disconnection unit in the activated state,
a second disconnection unit formed by a second actuatable switch-off unit and the overcurrent protection apparatus, wherein the second switch-off unit is designed to channel the overcurrent to the overcurrent protection apparatus interrupting the flow of current through the second disconnection unit in the activated state;
a control unit that, in order to disconnect the high-voltage line, is designed to activate at least the second switch-off unit in the case of an overcurrent flowing through the high-voltage line and to activate at least the first switch-off unit in the case of an event independent of an overcurrent, and
a discharge unit for discharging a high-voltage intermediate circuit of the high-voltage on-board power system, which discharge unit is electrically connected to the overcurrent protection apparatus and is able to be electrically connected to the high-voltage intermediate circuit via the overcurrent protection apparatus, wherein
the disconnection device, in the activated state of the discharge unit, is designed to form a discharge path through the overcurrent protection apparatus and the discharge unit.

14. The disconnection device according to claim 13, wherein
the control unit is designed to additionally activate the discharge unit in the case of the event independent of an overcurrent.

15. The disconnection device according to claim 13, wherein
the discharge unit has a series circuit comprising a switch-on unit and a discharge resistor, wherein
the switch-on unit, in the activated state, in order to form the discharge path, is designed to electrically connect the high-voltage intermediate circuit to the discharge resistor via the overcurrent protection apparatus.

16. The disconnection device according to claim 15, wherein
the switch-on unit is designed as a pyrotechnic switch-on unit.

17. A high-voltage on-board power system for a motor vehicle, comprising:
- at least one high-voltage line in order to electrically connect high-voltage components of the high-voltage on-board power system; and
- at least one disconnection device according to claim 1.

18. A motor vehicle comprising a high-voltage on-board power system according to claim 17.

* * * * *